(12) United States Patent
Eisele

(10) Patent No.: US 10,795,085 B2
(45) Date of Patent: Oct. 6, 2020

(54) TUBE SLITTER WITH OFF-AXIS HINGE

(71) Applicant: Ripley Tools, LLC, Cleveland, OH (US)

(72) Inventor: Will Eisele, New Britain, CT (US)

(73) Assignee: Ripley Tools, LLC, Cleveland, OH (US)

(*) Notice: Subject to any disclaimer, the term of this patent is extended or adjusted under 35 U.S.C. 154(b) by 10 days.

(21) Appl. No.: 16/161,535

(22) Filed: Oct. 16, 2018

(65) Prior Publication Data

US 2019/0113681 A1    Apr. 18, 2019

Related U.S. Application Data

(60) Provisional application No. 62/572,596, filed on Oct. 16, 2017, provisional application No. 62/725,557, filed on Aug. 31, 2018.

(51) Int. Cl.
  *G02B 6/245*  (2006.01)
  *B26D 3/00*   (2006.01)
  *G02B 6/44*   (2006.01)

(52) U.S. Cl.
  CPC .............. *G02B 6/245* (2013.01); *B26D 3/001* (2013.01); *G02B 6/4497* (2013.01)

(58) Field of Classification Search
  CPC ................................. B26D 3/001; G02B 6/245
  See application file for complete search history.

(56) References Cited

U.S. PATENT DOCUMENTS

| | | | |
|---|---|---|---|
| 4,081,871 A | 4/1978 | Knuth | |
| 5,325,587 A | 7/1994 | Steiner et al. | |
| 8,353,107 B2 * | 1/2013 | Daggett | H02G 1/1229 30/114 |

(Continued)

FOREIGN PATENT DOCUMENTS

DE    102015118439 A1    5/2017

OTHER PUBLICATIONS

Machine translation of DE 102015118439 (Year: 2017).*

*Primary Examiner* — Stephen Choi
(74) *Attorney, Agent, or Firm* — Delio Peterson & Curcio; Thomas E. Ciesco

(57) ABSTRACT

A tube jacket slitting tool including first and second opposite tool portions, each tool portion including a common hinged portion at a first end for engaging the opposite tool portion. The first and second opposite tool portions are foldable about the hinged portion between an open position and a closed position. The tool includes at least one concave surface extending across the width of forming an opening, when the first and second opposite tool portions are in the closed position, through which a tube may be slid. The tool includes a blade extending inward into the opening for slitting a depth of the tube jacket as it is moved with respect to the tool. The tool includes a hinge pivot axis in the hinged portion extending in a direction substantially in the direction of the width and at an acute angle to either the plane or to the longitudinal axis of the tube or cable in the opening formed by the at least one concave surface. When the first and second opposite tool portions are folded to the closed position with the tube or cable in the opening, movement of the tube or cable with respect to the tool causes the first and second opposite tool portions to be urged toward each other.

15 Claims, 16 Drawing Sheets

(56) References Cited

U.S. PATENT DOCUMENTS

2002/0017335 A1    2/2002  Lo et al.
2013/0152758 A1    6/2013  Blackwell et al.
2019/0103735 A1*  4/2019  Lu ........................ H02G 1/1217

* cited by examiner

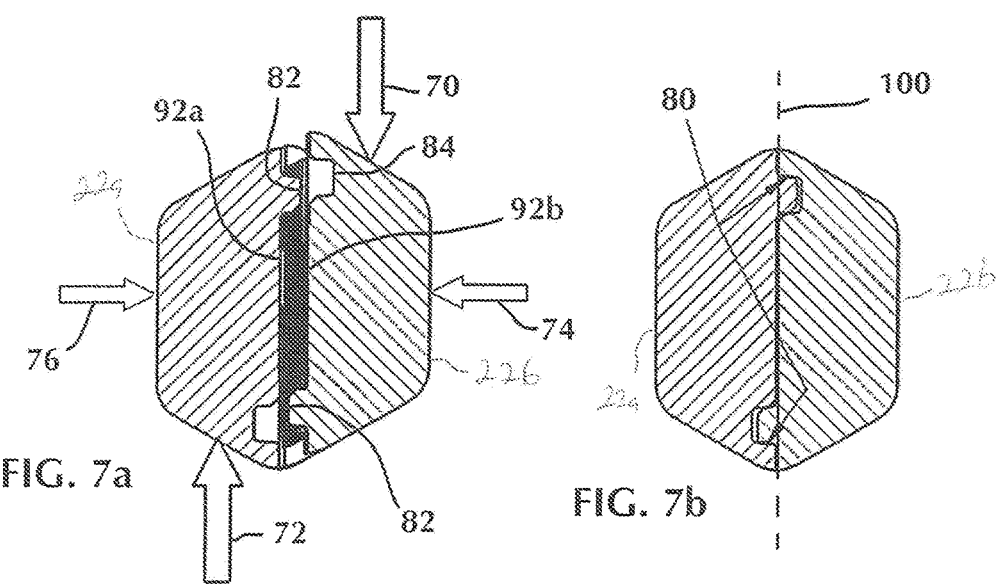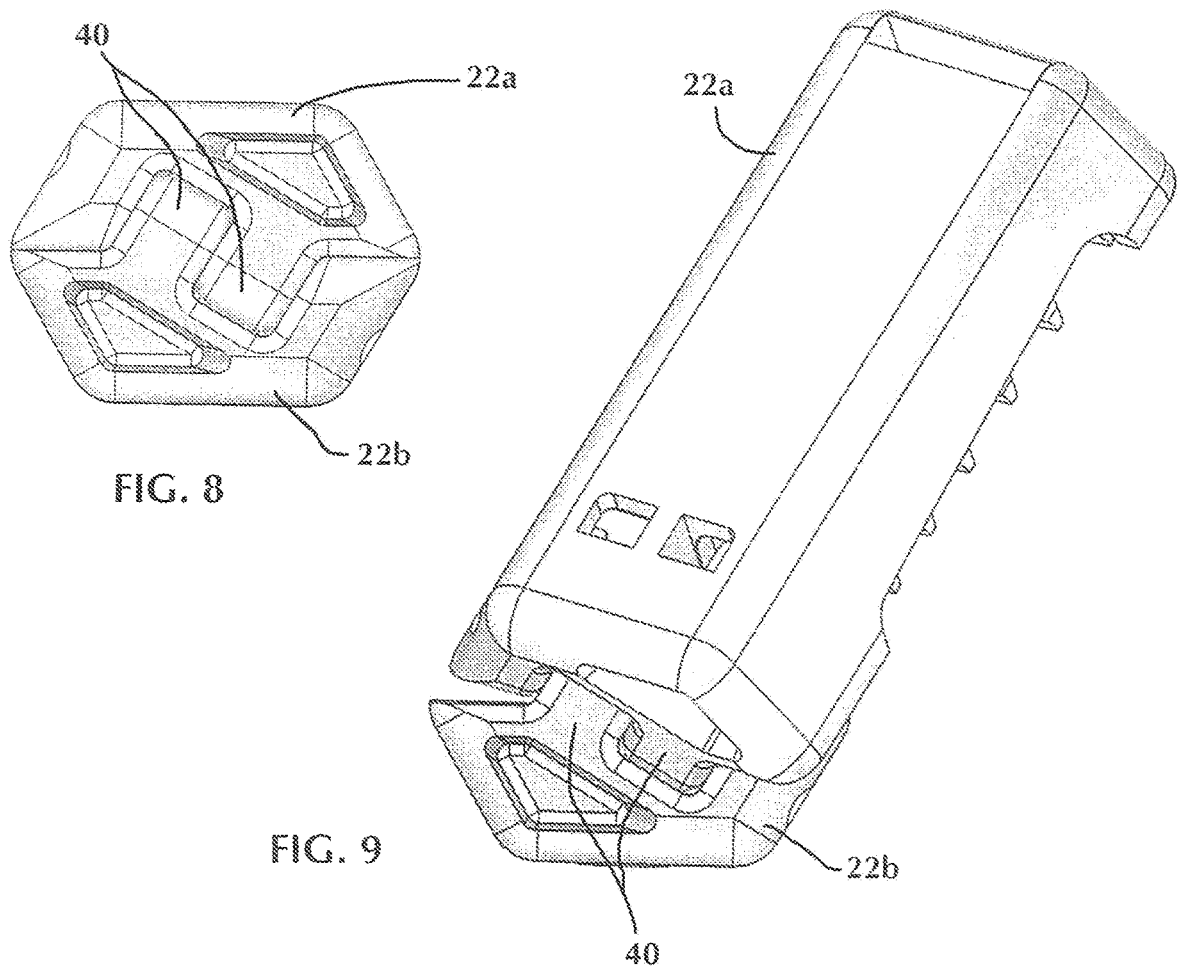

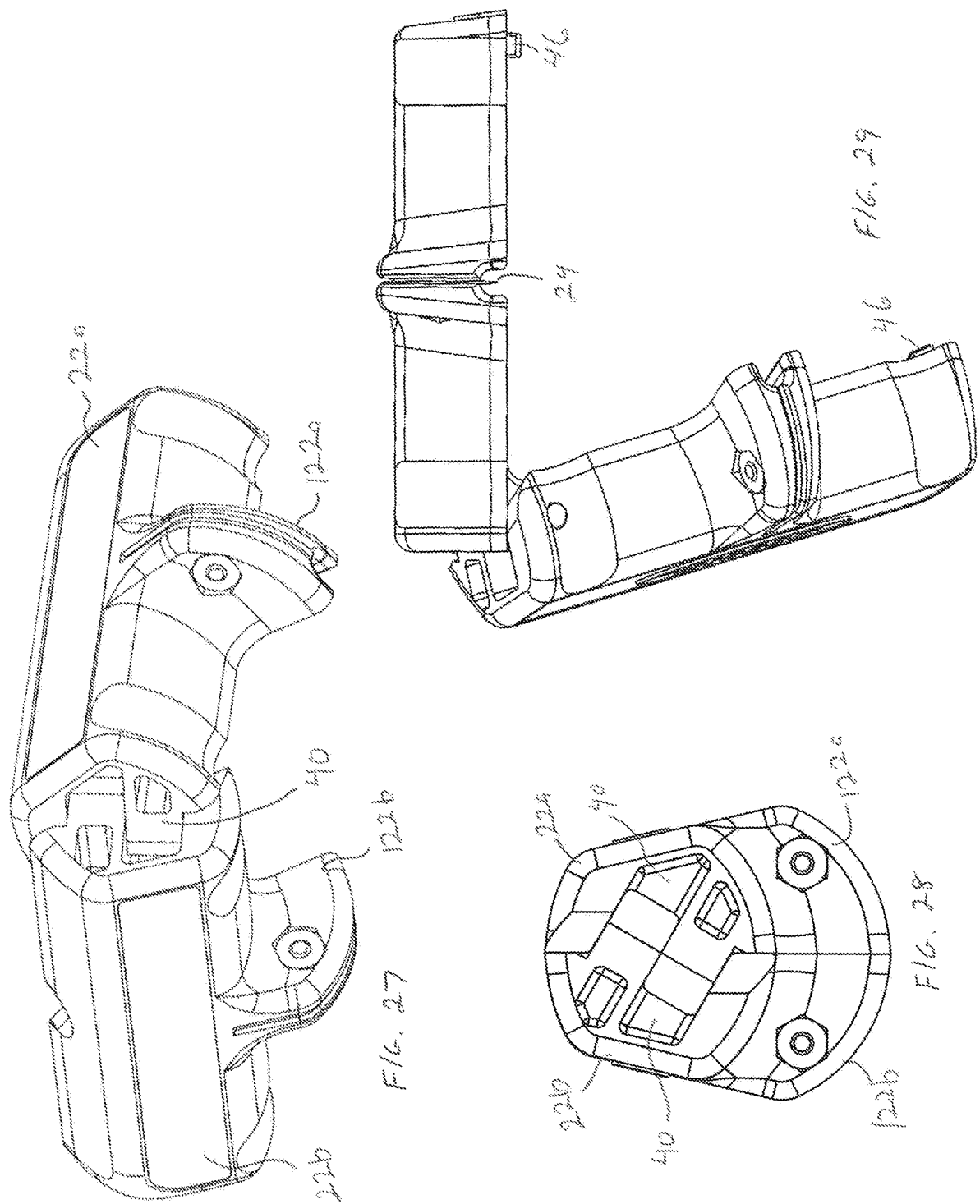

TUBE SLITTER WITH OFF-AXIS HINGE

BACKGROUND OF THE INVENTION

1. Field of the Invention

The present invention is directed to a tool for mid-span slitting or cutting tubes, cables or insulating jackets of cables carrying signal- or power-transmitting conduits, such as fiber optic cables.

2. Description of Related Art

Fiber optic cables come in many different configurations and jacket thicknesses. In some applications, many fibers are contained in a single tube. Conventional tools used for midspan application can be difficult to use and inaccurate. Some have blade depth adjustments which can be difficult to set correctly. Other tools have a series of channels with integral blades set to specific depths. These tools rely on the opposite side blades to pierce the jacket wall. They have a clip that can be difficult to operate, and ultimately rely on the precision of the clip feature to set the depth of the cut. Other tools which do not use a clip must be squeezed with continuous pressure as the tool is brought down the cable.

Mid-span cable or tube slitter products on the market can be categorized into two groups. The first group is the adjustable blade slitters. This group of tools has more moving parts, fewer blades, and require the user to adjust depth of the blade corresponding to each cable size. The second group are fixed blade slitters. These tools have different channels sized for the outer diameter of the range of tubes. Aligned in these channels are blades with depths related to the overall wall thickness.

The fixed blade tool category can be divided into locking tools and tools that do not lock. Locking tools require the end user to use a lock or latch to close the tool around the tube. The problem in this style of tool is that the tool will be forced open as it is being used. Since the latch will always need some amount of clearance to work properly, there is always some finite amount of loosening, as shown in FIG. 1. This causes the overall diameter and blade setting to lose accuracy. This will result in longitudinal cuts that do not pierce the jacket fully.

Tools that do not have a latch must be held closed by the operator. This helps in maintaining the correct setting for the tool. However, since current tools have the hinge parallel to the tube direction, it causes extra strain on the operator of the tool. The tool must be pulled down the tube, while at the same time being squeezed perpendicular to the direction of the pull. If the operator releases pressure on the tool, the blades will slide out of contact with the tube and the cut will end, as shown in FIG. 2. This constant need to apply pressure makes this style tool difficult to achieve consistent cut depths. In many cases two-handed operator is the only way to use the tool properly.

SUMMARY OF THE INVENTION

Bearing in mind the problems and deficiencies of the prior art, it is therefore an object of the present invention to provide a tool that has improved ergonomics for the operator and improved precision for midspan slitting and cutting applications.

Still other objects and advantages of the invention will in part be obvious and will in part be apparent from the specification.

The above and other objects, which will be apparent to those skilled in the art, are achieved in the present invention which is directed to a tube or cable jacket slitting or cutting tool including first and second opposite tool portions, each tool portion including a common hinged portion at a first end for engaging the opposite tool portion. The first and second opposite tool portions are foldable about the hinged portion between an open position and a closed, folded-together position, each of the first and second opposite tool portions having a length, width, and height, with the length extending in the direction from the hinged portion at the one end to a second end opposite the hinge. The width extends in the direction perpendicular to the length and the height extends in the direction perpendicular to the length and width, the first and second opposite tool portions meeting along a plane comprising the length and width when in the closed position. The tube or cable jacket slitting or cutting tool includes at least one concave surface extending across the width of at least one of the first and second tool portions, the at least one concave surface forming an opening, when the first and second opposite tool portions are in the closed position, through which a tube or cable may be slid with respect to the tool. The tube or cable jacket slitting or cutting tool includes a blade extending inward into the opening formed by the at least one concave surface for slitting or cutting a depth of the tube or cable jacket as it is moved with respect to the tool. The tube or cable jacket slitting or cutting tool includes a hinge pivot axis in the hinged portion extending in a direction substantially in the direction of the width and at an acute angle to either the plane or to the longitudinal axis of the tube or cable in the opening formed by the at least one concave surface. When the first and second opposite tool portions are folded to the closed position with the tube or cable in the opening, the blade cuts into the tube or cable outer jacket and movement of the tube or cable with respect to the tool in one direction to slit or cut the tube or cable jacket with the blade causes the first and second opposite tool portions to be urged toward each other. Each of the tool portions may include an alignment portion disposed near the second end and the first tool portion alignment portion may be engagable with the second tool portion alignment portion for maintaining alignment of the tool when the tool is in the closed position. The tube or cable jacket slitting or cutting tool may include a projection extending from a side of first and second opposite tool portions in the direction of the tool width and wherein the at least one concave surface extends through the projection. The blade may extend inward into the opening formed by the at least one concave surface in the projection. The projection may extend between a user's fingers when the user grasps the tool with the fingers extend substantially around the closed tool portions. The blade may extend inward into the opening formed by the at least one concave surface in the projection. The at least one concave surface and blade may be removable as a unit from the at least one of the first and second tool portions. The tube or cable jacket slitting or cutting tool may include at least one concave surface formed into and extending across the width of each of the first and second tool portions, the at least one concave surface in each tool portion being in alignment with the other concave surface to form an opening, wherein when the first and second opposite tool portions are in the closed position, the tube or cable may be slid through the opening with respect to the tool. The tool may include a magnet secured in the first or second tool portion and an alloy dowel pin secured in the other of the first or second tool portion wherein the magnet is disposed adjacent the alloy dowel when the tool is in the closed position, maintaining the tool in the closed position when a tube is drawn through the tool.

Another aspect of the present invention is directed to a method of using the tube or cable slitting tool as described above. The method includes ensuring the first and second tool portions are in an open position and placing a tube or cable having an outer jacket into the opening formed by the at least one concave surface of the first or second tool portion. The method includes moving the first and second tool portions to the closed position whereby the blade extending inward into at opening cuts the tube or cable outer jacket and drawing a portion of the tube or cable with respect to the tool in a parallel direction to the at least one concave surface of the first or second tool half whereby the blade produces an elongated slit in the tube or cable jacket. The method includes moving the tool to the open position and removing the slit tube or cable from the at least one concave surface of the first or second tool portion. Drawing the tube through the opening formed by the at least one concave surface in one direction may cause the first and second opposite tool portions to be urged toward one another. One or both of the tool portions may include a projection extending from a side thereof in the direction of the tool width, with the opening formed by the at least one concave surface extending through the projection wherein during drawing the tube through the at least one concave surface in one direction the projection extends between the tool operator's fingers when the user grasps the tool with the fingers extend substantially around the closed tool portions. The blade may extend inward into the opening formed by the at least one concave surface in the projection.

Another aspect of the present invention is directed to a tube or cable jacket slitting or cutting tool including first and second opposite tool portions, each tool portion having a common hinged portion at a first end for engaging the opposite tool portion. The first and second opposite tool portions are foldable about the hinged portion between an open position and a closed, folded-together position, each of the first and second opposite tool portions having a length, width, and height. The length extends in the direction from the hinged portion at the one end to a second end opposite the hinge. The width extends in the direction perpendicular to the length, and the height extends in the direction perpendicular to the length and width. The first and second opposite tool portions meeting along a plane comprising the length and width when in the closed position. The tube or cable jacket slitting or cutting tool includes a projection extending from a side of first and second opposite tool portions in the direction of the tool width and at least one concave surface extending across the width of at least one of the first and second tool portions and through the projection. The at least one concave surface forms an opening, when the first and second opposite tool portions are in the closed position, through which a tube or cable may be slid with respect to the tool. The tube or cable jacket slitting or cutting tool includes a blade extending inward into the opening formed by the at least one concave surface in the projection for slitting or cutting a depth of the tube or cable jacket as it is moved with respect to the tool. When the first and second opposite tool portions are folded to the closed position with the tube or cable in the opening, the blade cuts into the tube or cable outer jacket and movement of the tube or cable with respect to the tool in one direction causes the blade to cut the tube or cable jacket. The tube or cable jacket slitting or cutting tool may include a hinge pivot axis in the hinged portion extending in a direction substantially in the direction of the width and at an acute angle to either the plane or to the longitudinal axis of the tube or cable in the opening formed by the at least one concave surface. When the first and second opposite tool portions are folded to the closed position with the tube or cable in the opening, the blade cuts into the tube or cable outer jacket and movement of the tube or cable with respect to the tool in one direction to slit or cut the tube or cable jacket with the blade causes the first and second opposite tool portions to be urged toward each other. A method of using the tube or cable slitting tool as described includes ensuring the first and second tool portions are in an open position and placing a tube or cable having an outer jacket into the opening formed by the at least one concave surface of the first or second tool portion. The method includes moving the first and second tool portions to the closed position whereby the blade extending inward into at opening cuts the tube or cable outer jacket and grasping the tool with a user's fingers extend substantially around the closed tool portions wherein the projection extends between the tool operator's fingers. The method includes drawing a portion of the tube or cable with respect to the tool in a parallel direction to the at least one concave surface of the first or second tool half whereby the blade produces an elongated slit in the tube or cable jacket, moving the tool to the open position and removing the slit tube or cable from the at least one concave surface of the first or second tool portion. The tool may include a hinge pivot axis in the hinged portion extending in a direction substantially in the direction of the width and at an acute angle to either the plane or to the longitudinal axis of the tube or cable in the opening formed by the at least one concave surface wherein drawing the tube through the opening formed by the at least one concave surface with respect to the tool in one direction causes the first and second opposite tool portions to be urged toward one another.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIGS. 7*a* and 7*b* show forces on the tube slitter of FIG. 3 in a semi-closed and closed position.

FIG. 8 is a rear elevational view of the tube slitter of FIG. 3 in the closed position.

FIG. 9 is a rear elevational view of the tube slitter of FIG. 3 in the open position.

FIG. 27 is a perspective view of the tube slitter of FIG. 14 in the open position showing the hinge.

FIG. 28 is a left elevational view of the tube slitter of FIG. 14 in the open position.

FIG. 29 shows a front perspective view of the tube slitter in an open position.

DESCRIPTION OF THE EMBODIMENT(S)

In describing the embodiment of the present invention, reference will be made herein to FIGS. 1-37 of the drawings in which like numerals refer to like features of the invention.

The tool of the present invention may be employed with a fixed blade to cut or slit a tube or cable, including cable jacket or insulation, to a desired depth set by the dimension of the blade. The tool of the present invention uses an angled hinge to rotate the blade(s) into the tube or cable jacket using the same motion as tool operation. This action eases the stress put on the tool operator. The instant tool does not need to rely on a clip to set the closed tool position, so it is more accurate than locking tools.

Figure 1:
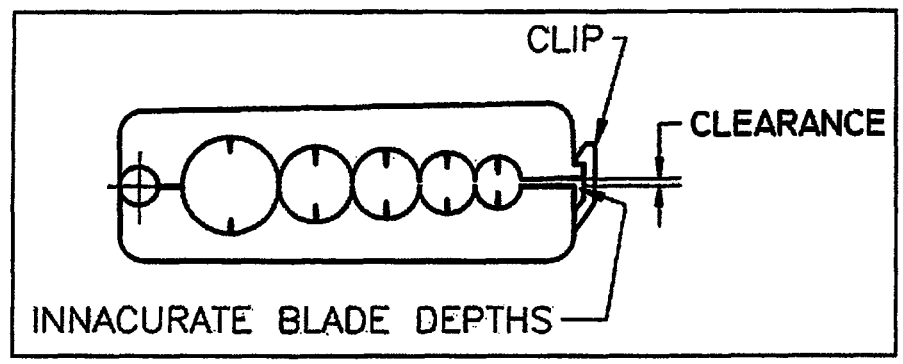
FIG. 1 shows a side view of a locking style prior art mid-span cutting tool.
Figure 2:
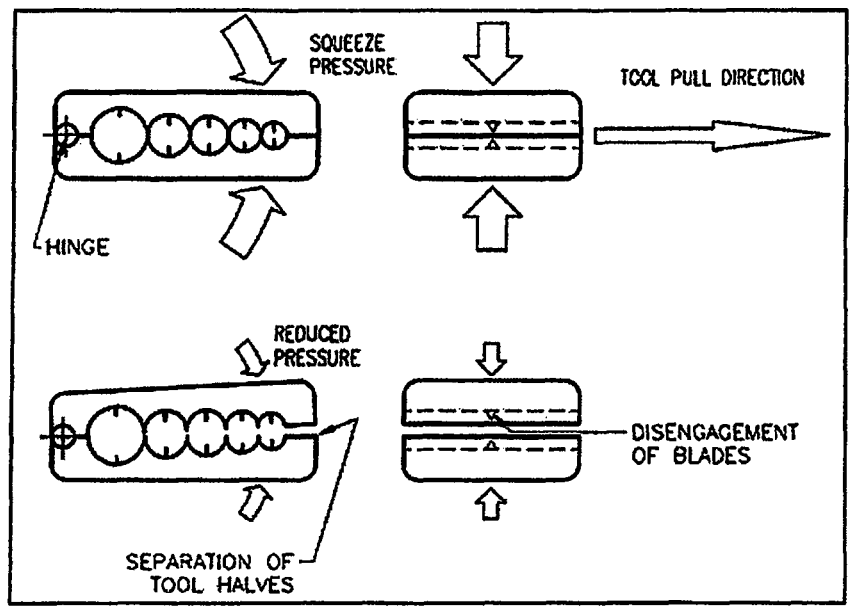
FIG. 2 shows end and side views of a non-locking style prior art mid-span cutting tool.
Figure 3:
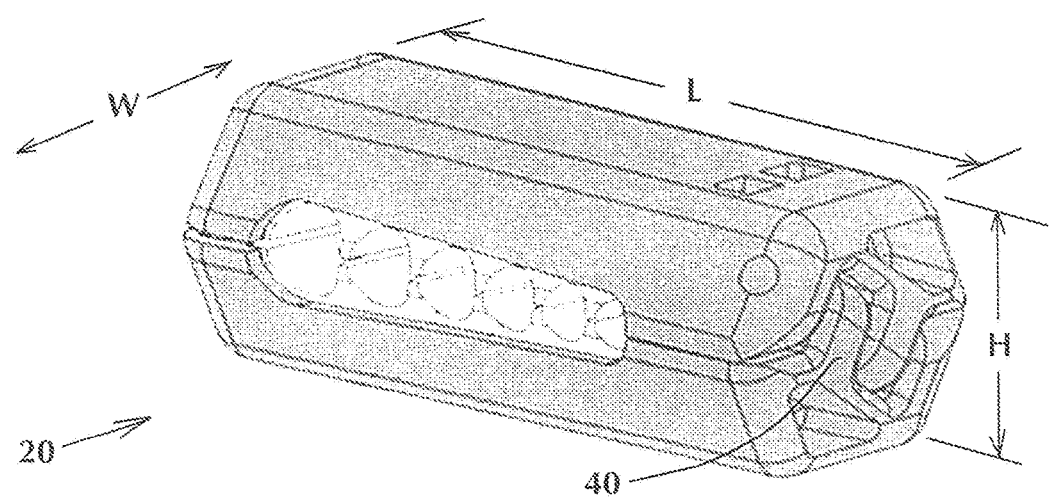
FIG. 3 is a perspective view of an embodiment of the tube slitter tool of the present invention in the closed position.
Figure 4:
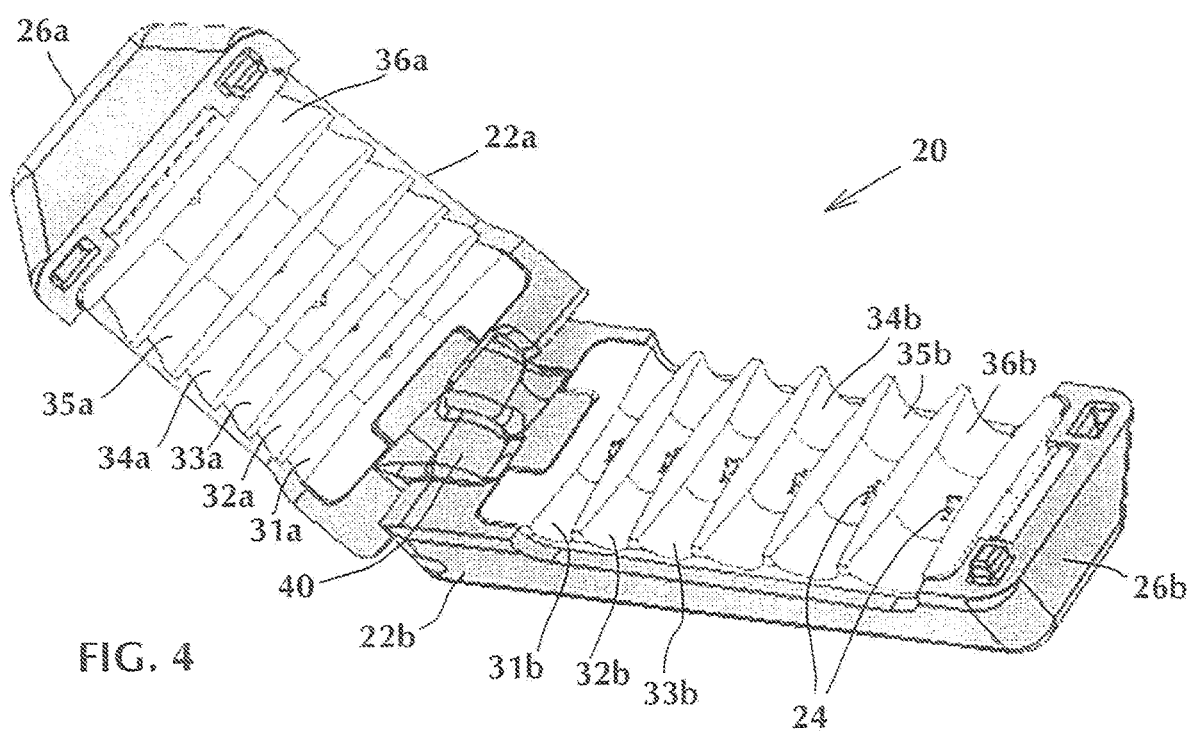
FIG. 4 is a perspective view of the tube slitter of FIG. 3 in the open position according to the present invention.
Figure 5:
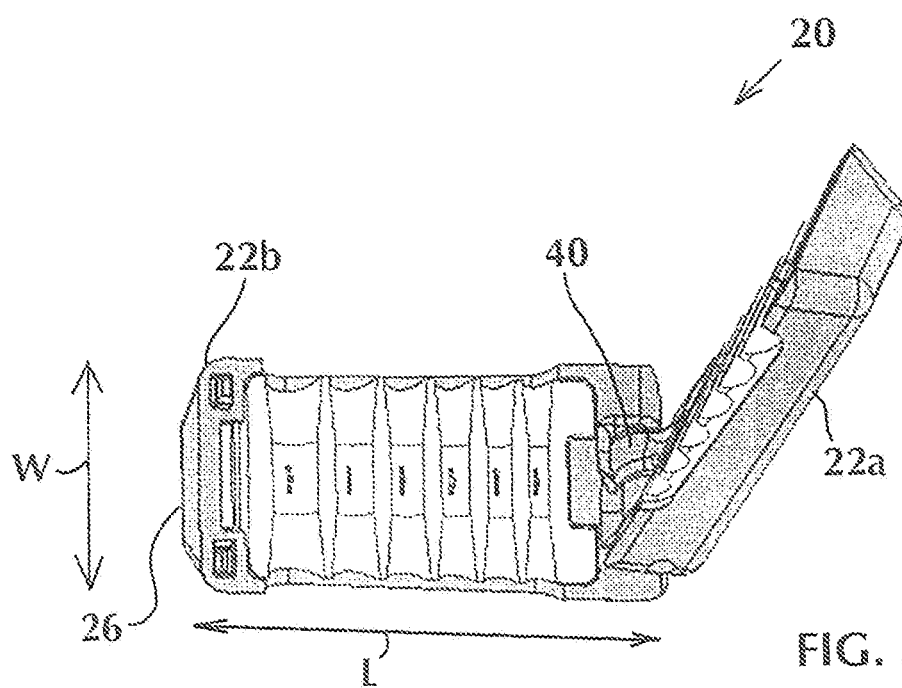
FIG. 5 is a top elevational view of the tube slitter of FIG. 3 in the open position according to the present invention.

A first embodiment of the tube slitter tool of the present invention is shown in FIGS. 3-13. As shown in FIGS. 3-5, tool 20 of the present invention has first and second body halves, identified as first body portion 22a and second body portion 22b joined at one end by off-axis hinge 40. Body portions 22a, 22b when folded together (FIG. 1) meet along a plane. Each body portion 22a, 22b has a length L in the direction from the hinge 40 end of the body to the end 26a, 26b opposite the hinge, and a width W perpendicular to the length. Molded or otherwise formed into and across the width of each body portion are one or more semi-cylindrical or otherwise concave or indented surfaces, channels or grooves 31a, 31b, 32a, 32b, 33a, 33b, 34a, 34b, 35a, 35b, 36a, 36b. When the body portions 22a, 22b are closed together, the semi-cylindrical surfaces form cylindrical openings with longitudinal axes generally perpendicular to the body length and parallel to the body width, and that have different desired diameters to accommodate tubes or cable of different diameters within the height H of each body portion. The indentations, channels or grooves 31a, 31b, 32a, 32b, 33a, 33b, 34a, 34b, 35a, 35b, 36a, 36b across the body portions may be configured to the shape of the tube or cable, such as rectangular, and may be in one or the other of the body portions 22a or 22b, instead of both as shown. The tool cylindrical openings diameters or widths may be the same or slightly larger than the cable to be slit, to enable the cable to be slid through with respect to the tool body. Projecting into each of the openings from the semi-cylindrical surfaces on one or both body portions is a slitting or cutting blade 24. Blade 24 extends into semi-cylindrical surfaces 31a, 31b, 32a, 32b, 33a, 33b, 34a, 34b, 35a, 35b, 36a, 36b a distance of height sufficient to cut through the cable jacket, or otherwise make the desired cut in the tube or cable. While this blade 24 is shown as being fixed, it is possible to employ blades whose depth may be adjusted. Instead of being integrally formed into and of one piece with body portions 22a, 22b, the cable indentations, channels or grooves 31a, 31b, 32a, 32b, 33a, 33b, 34a, 34b, 35a, 35b, 36a, 36b and their associated blades 24 may be provided as a cassette removable as a unit from within body portions 22a, 22b. This would permit common body portions 22a, 22b, joined by off-axis hinge 40, to be configured for cable diameters and blade heights for different customers and applications.

Figure 6A:
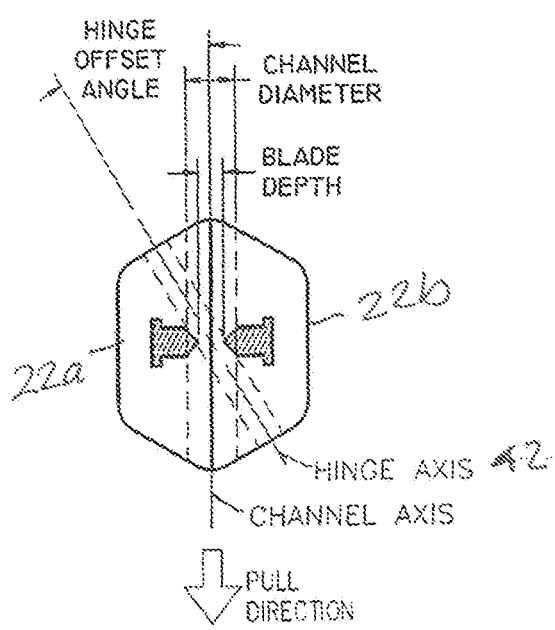
FIGS. 6*a* and 6*b* are front cutaway views showing the blades of the tube slitter of FIG. 3 in the closed position.
Figure 6B:
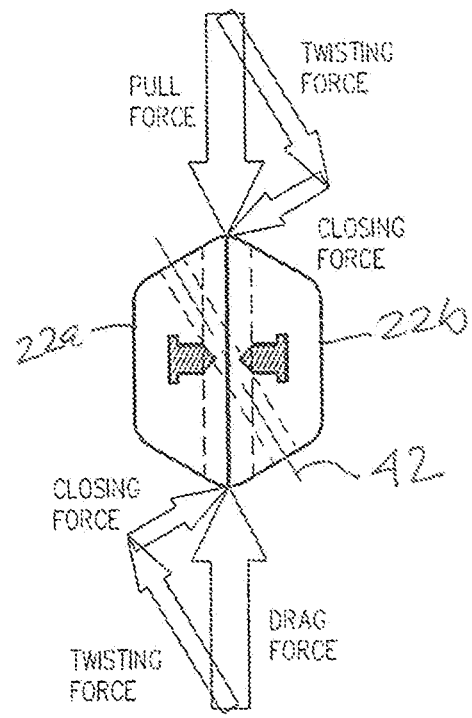
Figure 10:
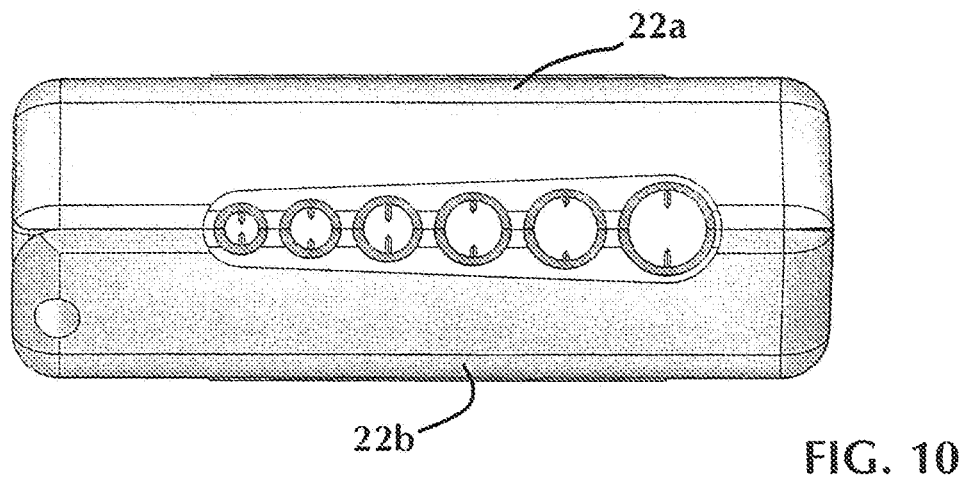
FIG. 10 is a side elevational view of the tube slitter of FIG. 3 in the closed position.
Figure 11:
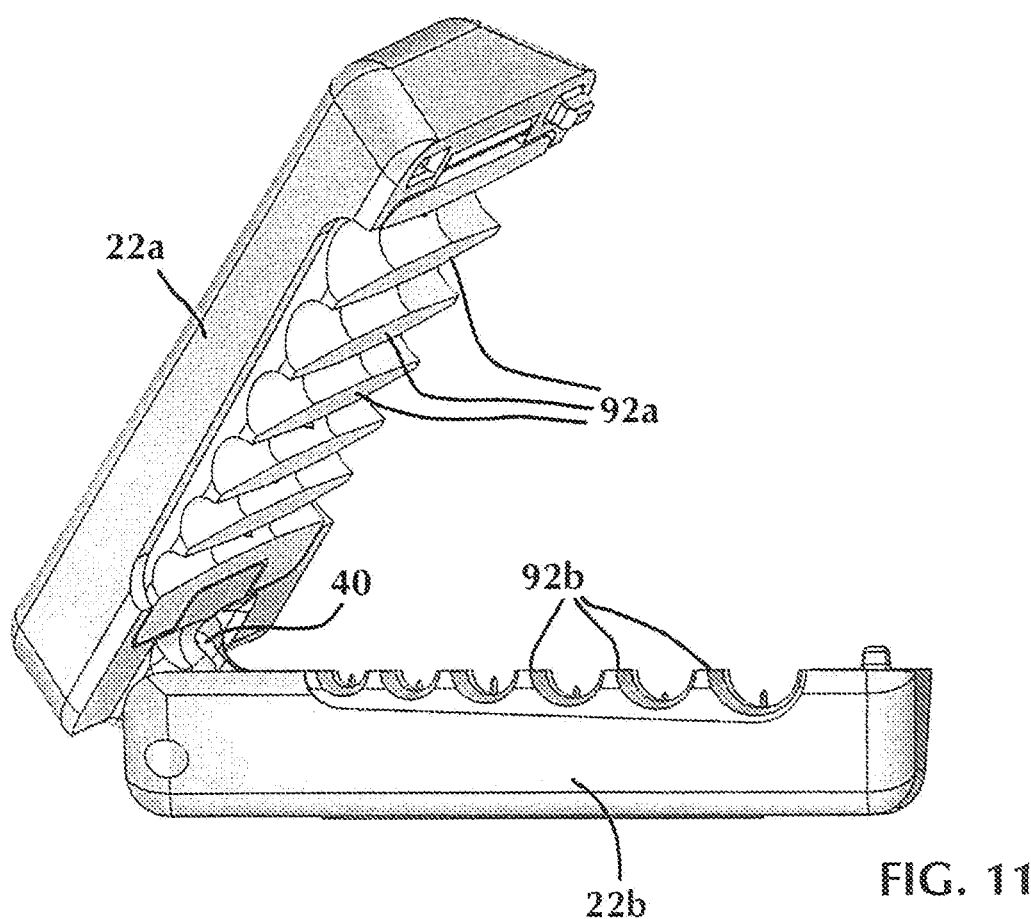
FIG. 11 is a side elevational view of the tube slitter of FIG. 3 in the open position.
Figure 12:
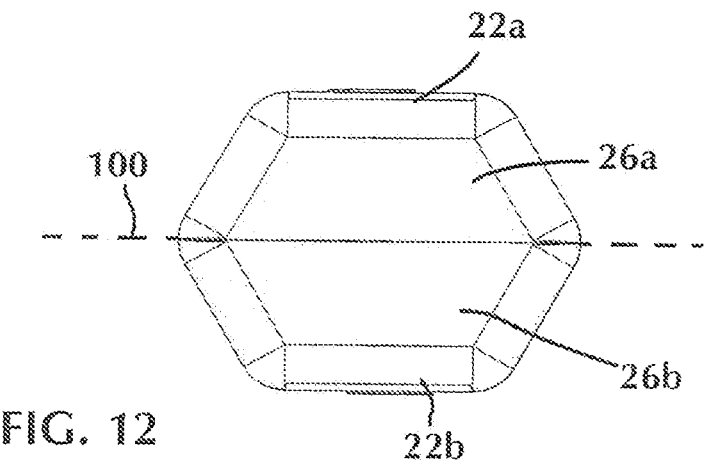
FIG. 12 is a front elevational view of the tube slitter of FIG. 3 in the closed position.
Figure 13:
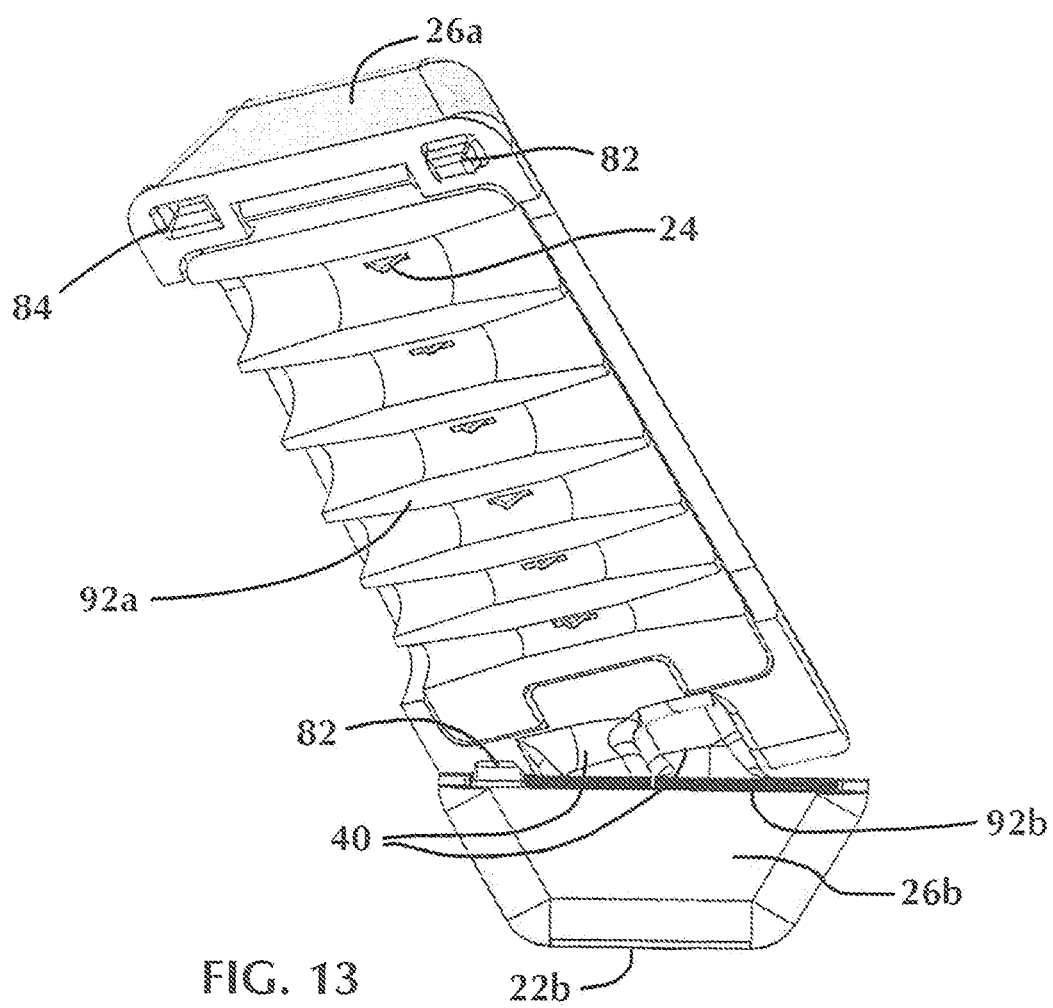
FIG. 13 is a front elevational view of the tube slitter of FIG. 3 in the open position.
Figure 14:
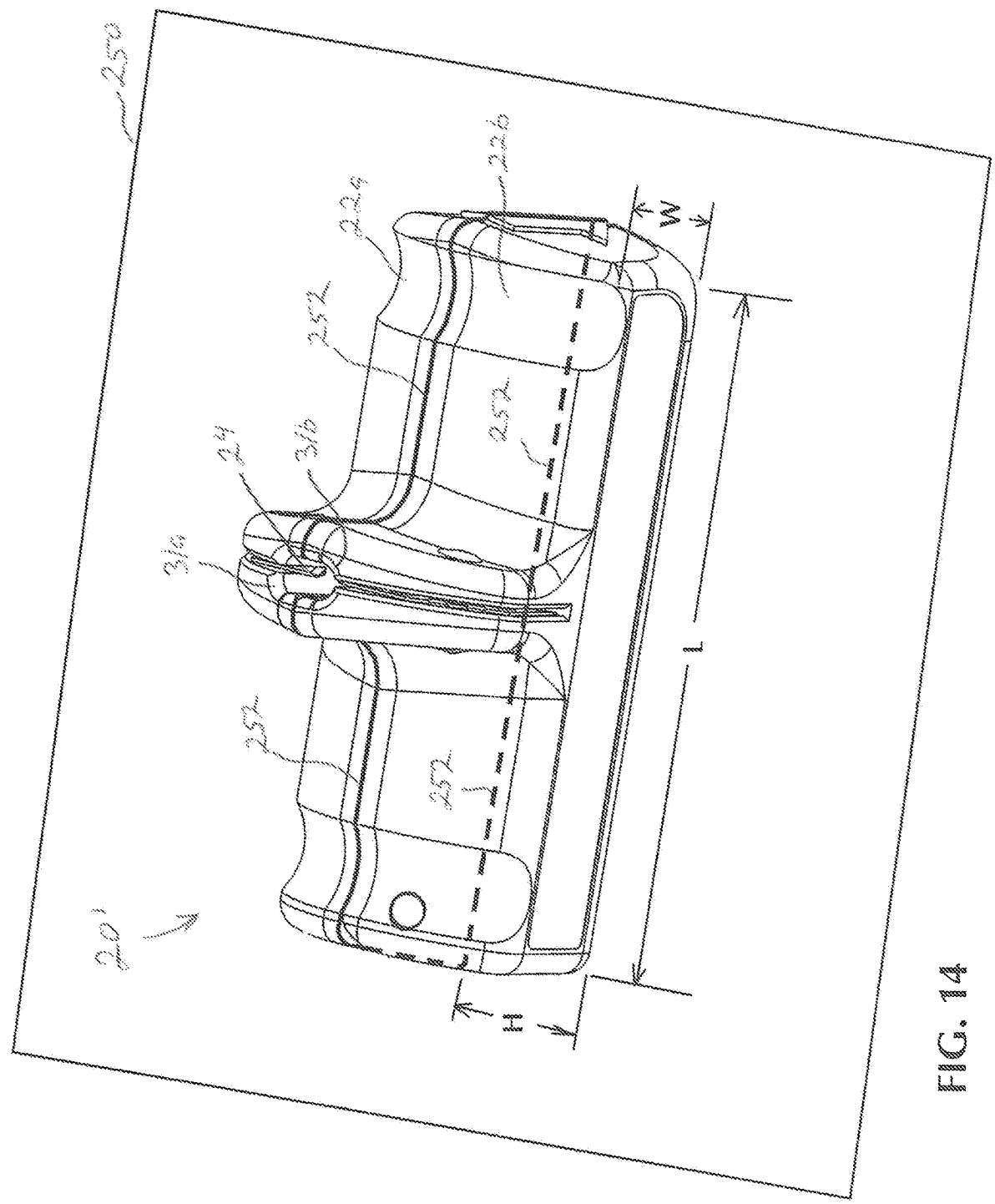
FIG. 14 is a right front bottom perspective view of another embodiment of the tube slitter in the open position.
Figure 16:
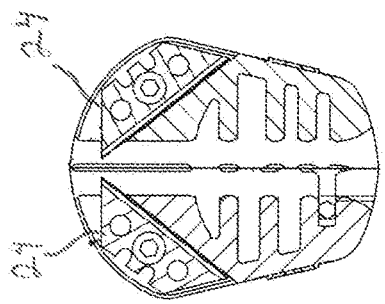
FIG. 16 is a left side cross-sectional view of the tube slitter of FIG. 15 in the closed position across cut lines 16-16.
Figure 18:
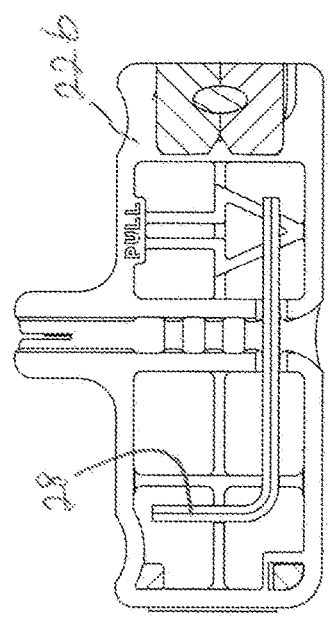
FIG. 18 is a bottom cross-sectional view of the tube slitter of FIG. 17 across cut lines 18-18.

The off-axis hinge 40 is shown in more detail in FIGS. 6a, 6b, 8, 9, 11 and 13. In FIGS. 6a and 6b, the opposite tool portions 22a, 22b are in the closed position and hinge pivot axis in hinge 40 extends in a direction substantially in the direction of the width of the tool and at an acute offset angle to both i) the plane along which the first and second opposite tool portions 22a, 22b meet and ii) the longitudinal axis of the tube or cable in the channel formed by the concave surfaces in the tool portions. The off-axis hinge configuration of the tool of the present invention relieves strain on the operator and ensures a consistent cut depth. It works by transferring the natural pressure of squeezing and pulling the tool directly to the blade. The hinge redirects the forces acting down the axis of the tool to move the tool halves closer together, tightening the blades into the cable, as shown by the force vectors in FIG. 6b. This reduces the strain on the operator because the need to drive the blades into the tube, cable or cable jacket is integrated into the natural pulling movement of the tool.

The pulling action of the tool with respect to the tube or cable creates twisting forces on the off-axis hinge. The instant tool supports those forces on the opposite, non-hinge, end of the tool using alignment features 80 that limit the twisting of the hinge. As shown in FIG. 7, the tool includes a face 92*a* on the first tool portion 22*a* which contacts the face 92*b* of the second tool portion 22*b* when the tool is in the closed position, the faces 92*a*, 92*b* meeting one another along a plane 100. The alignment features 80 comprise at least one protrusion 82 on the first tool portion 22*a* and at least one corresponding detent 84 on the tool second portion 22*b*. The protrusion 82 includes a top surface and tapered side walls extending from the top surface to the first tool face 92*a*. The detent 84 includes a bottom surface and tapered side walls extending from the bottom surface to the second tool face 92*b*. When first and second opposite tool portions 22*a*, 22*b* are folded to the closed position with the tube or cable between the at least one concave surface in each of the first and second tool portions 22*a*, 22*b*, movement of the tube or cable with respect to the tool in the direction of arrow 70 to cut the tube or cable jacket with the blade causes the first and second opposite tool portions 22*a*, 22*b* to be urged toward each other in the direction of arrows 74, 76. The protrusion 82 may be nearly engaged with the corresponding detent 84 as shown in FIG. 7*a*, and as the cable is drawn through in the direction of arrow 70, the force of the cable pulling the second portion 22*b* in the direction of arrow 70 allows the hinge 40 to force the tool portions 22*a*, 22*b* together in the direction of arrows 74, 76 because of the angle of the hinge 40 to the tool portion top surfaces 92*a*, 92*b* whereby the tool is urged to the fully closed position as shown in FIG. 7*b*. Additionally, the tool may be in the fully closed position before the cable is drawn in the direction of arrow 70 and the drawing movement maintains the tool in the closed position. The tool portions 22*a*, 22*b* may be forced away from one another directly by the user, or the cable may be drawn in the direction of arrow 72 to open the tool for removal of the cable or tube. These alignment features prevent excessive wear on the hinge and reduce the possibility that the tool halves will slide past each other beyond the designed closed position. The alignment features may include a protrusion 82 on each of the tool portions 22*a*, 22*b* engagable with a detent 84 on the opposition tool portion as shown in the embodiment of FIGS. 7*a* and 7*b*.

A second embodiment of the tube slitter tool 20' of the present invention is shown in FIGS. 14-34. This embodiment includes a similar off-axis hinge 40 but includes only one opening formed by concave surface indentation, channel or groove 31*a*, 31*b* across the width of the body portion configured to accept the shape of the tube or cable 50. The tool cylindrical opening diameter or width may be the same or slightly larger than the cable to be slit, to enable the cable to be slid through with respect to the tool body. Projecting into each of the semi-cylindrical surfaces on indentation, channel or groove 31*a*, 31*b* of the body portions is a slitting or cutting blade 24, which extends a distance of height sufficient to cut through the cable jacket, or otherwise make the desired cut in the tube or cable 50. In this embodiment, the body portion has extended from a side thereof a projection, consisting of body portions 122*a*, 122*b*, through which the opening formed by indentation, channel or groove 31*a*, 31*b* extends. This projection increases the width of the tool, compared to the width of body portions 22*a*, 22*b*. Blades 24 may be located in this projection, beyond the sides of the body portions 22*a*, 22*b*.

Figure 15:
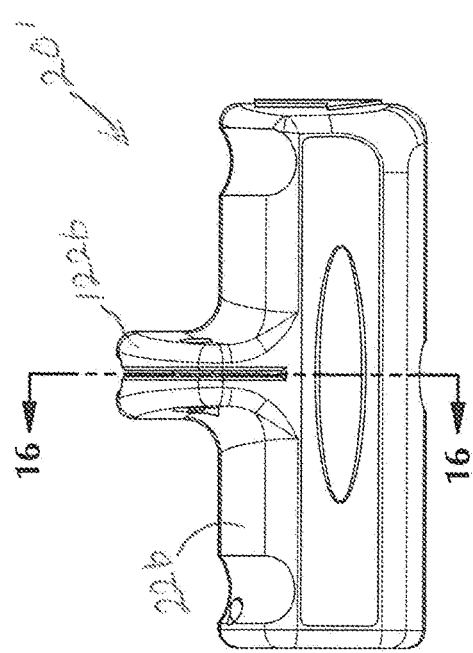
FIG. 15 shows a bottom plan view of the tube slitter tool shown in FIG. 14.
Figure 17:
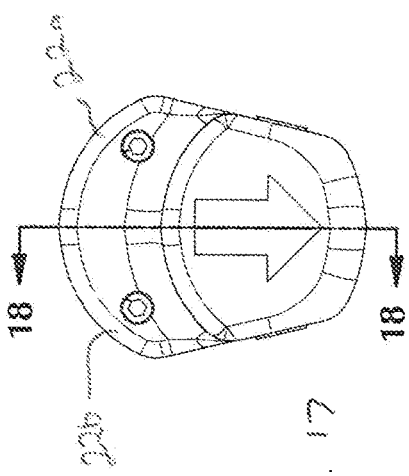
FIG. 17 is a right side elevational view of the tube slitter of FIG. 14 in the closed position according to the present invention.
Figure 19:
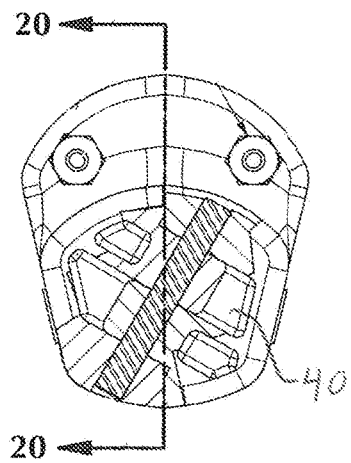
FIG. 19 is a left cross-sectional view of the tube slitter shown in FIG. 14.
Figure 20:
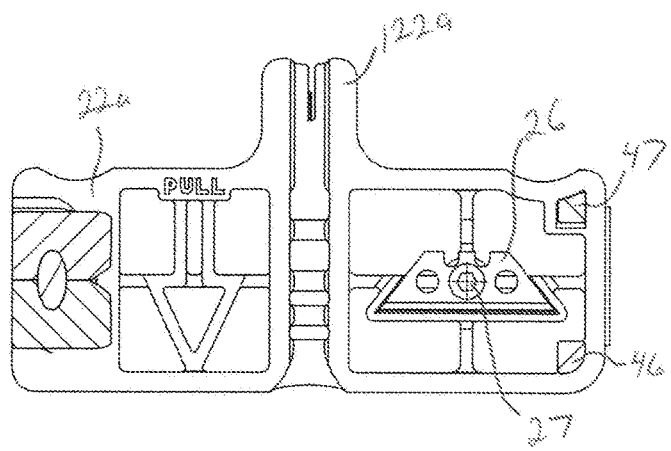
FIG. 20 is bottom cross-sectional view of the tube slitter shown in FIG. 19 across cut lines 20-20.
Figure 21:
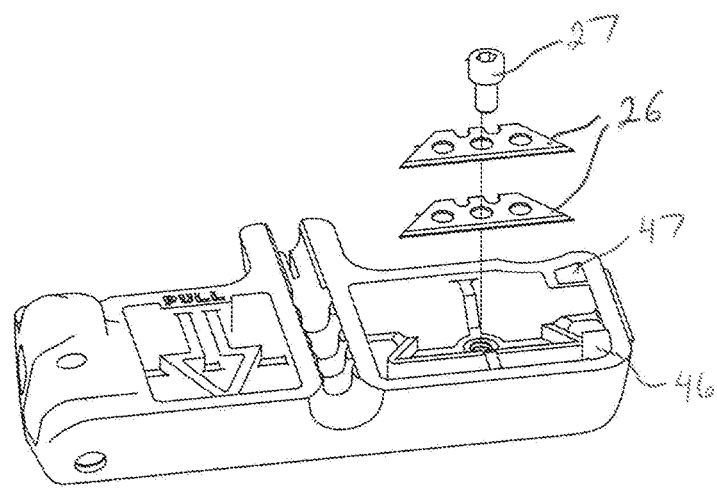
FIG. 21 is an exploded perspective view of the tube slitter of FIG. 14 showing one body portion with the storage for extra blades 26.
Figure 22:
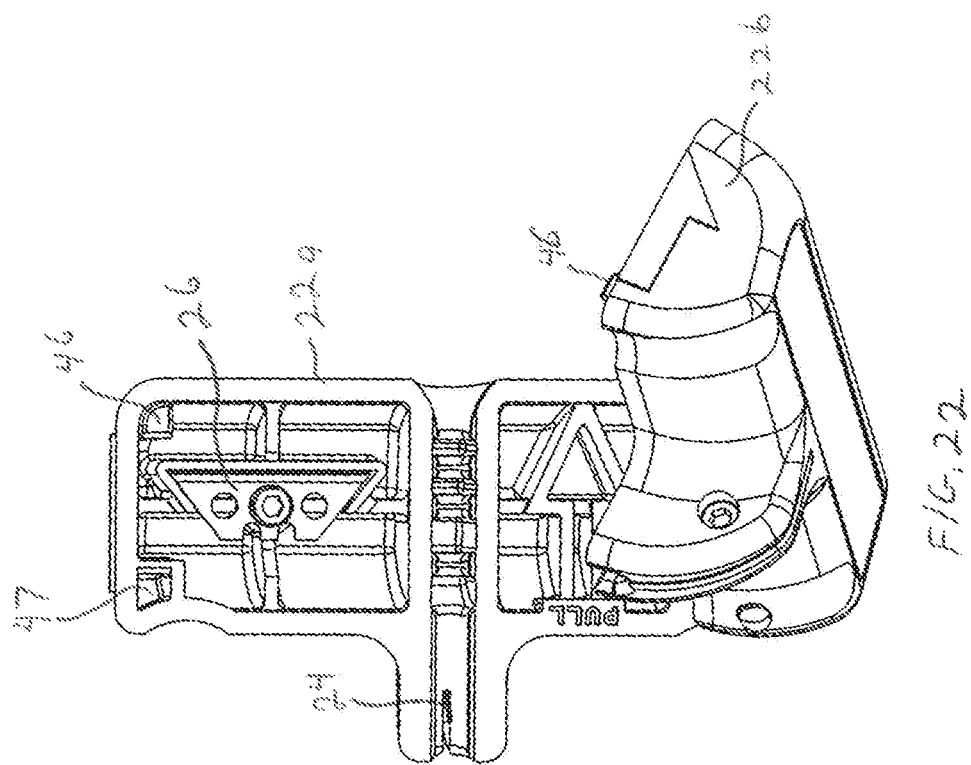
FIG. 22 is a perspective view of the tube slitter of FIG. 14 in the open position.
Figure 23:
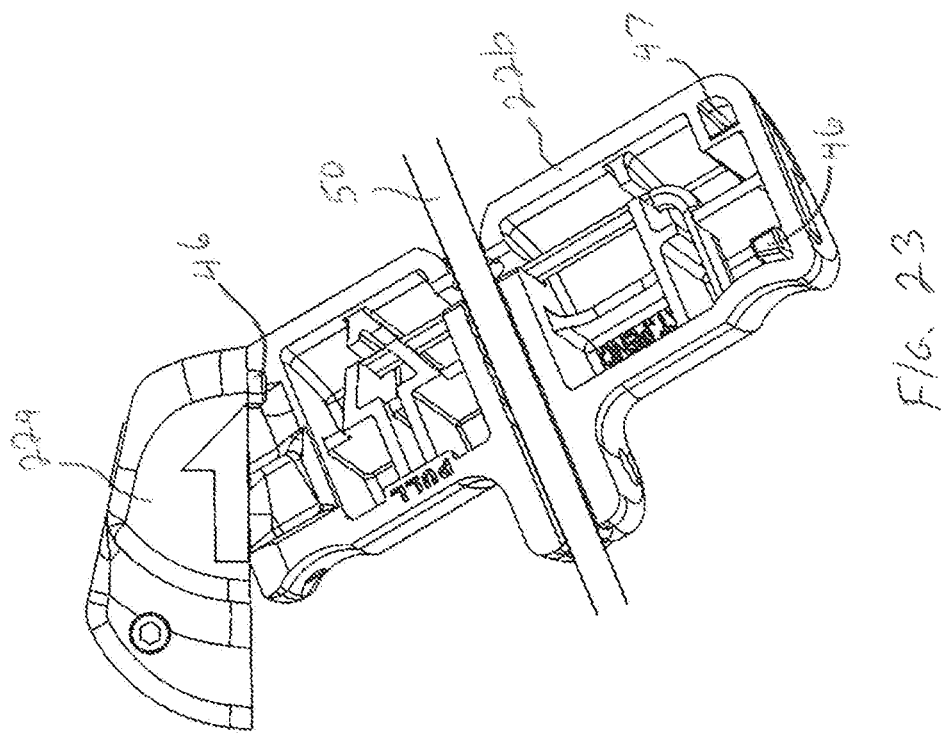
FIG. 23 is a perspective view of the tube slitter of FIG. 14 in the open position with a cable engaged in the groove of one body portion.
Figure 24:
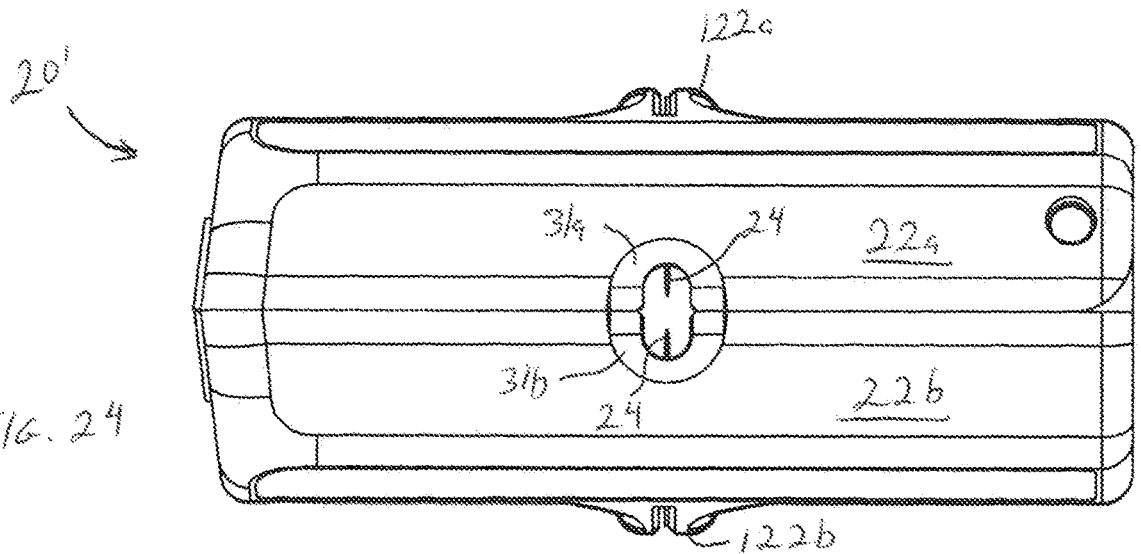
FIG. 24 is a rear elevational perspective view of the tube slitter of FIG. 14 in the open position.
Figure 25:
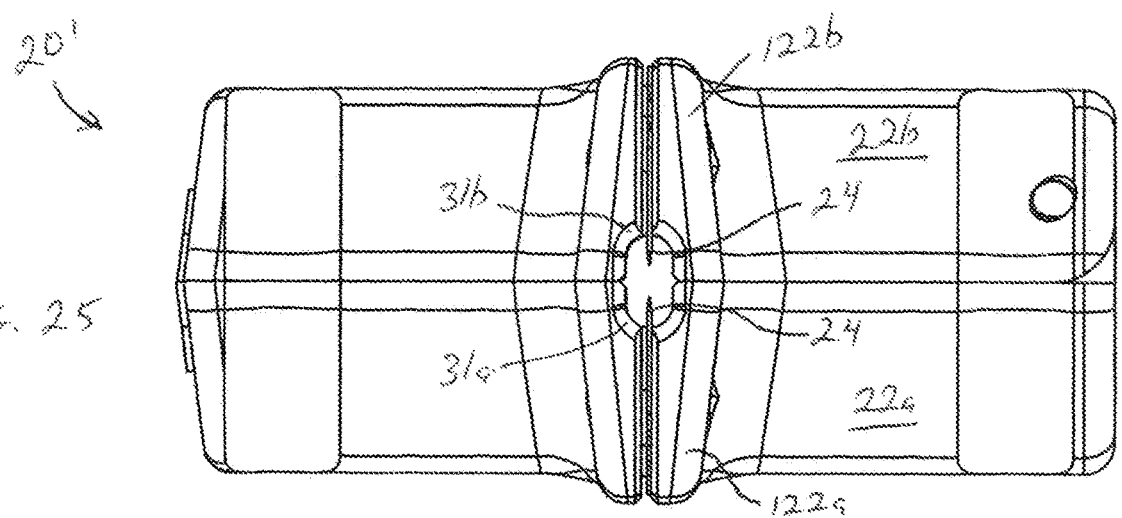
FIG. 25 is a front elevational view of the tube slitter of FIG. 14 in the open position.
Figure 26:
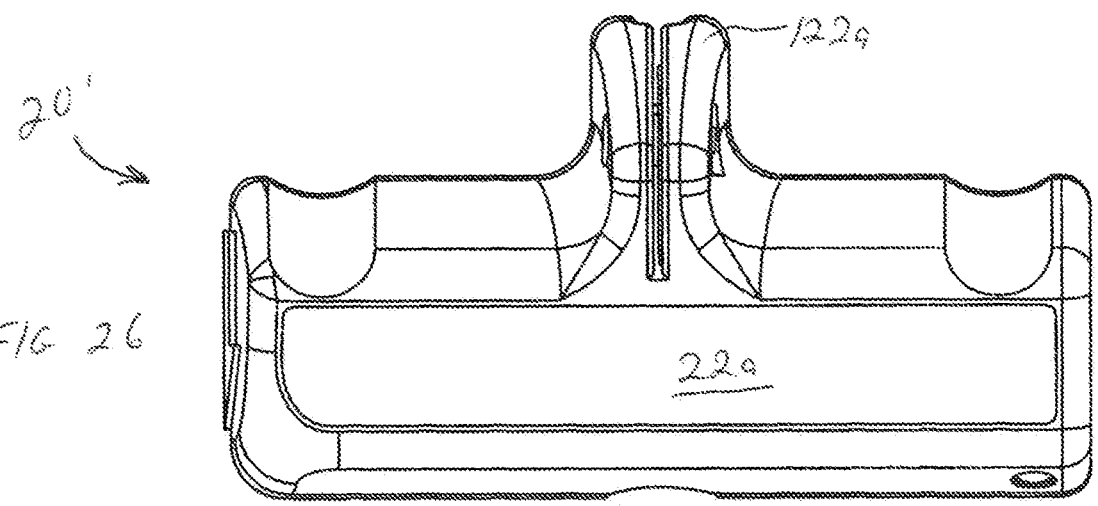
FIG. 26 is a bottom plan view of the tube slitter of FIG. 14 in the open position.
Figure 30:
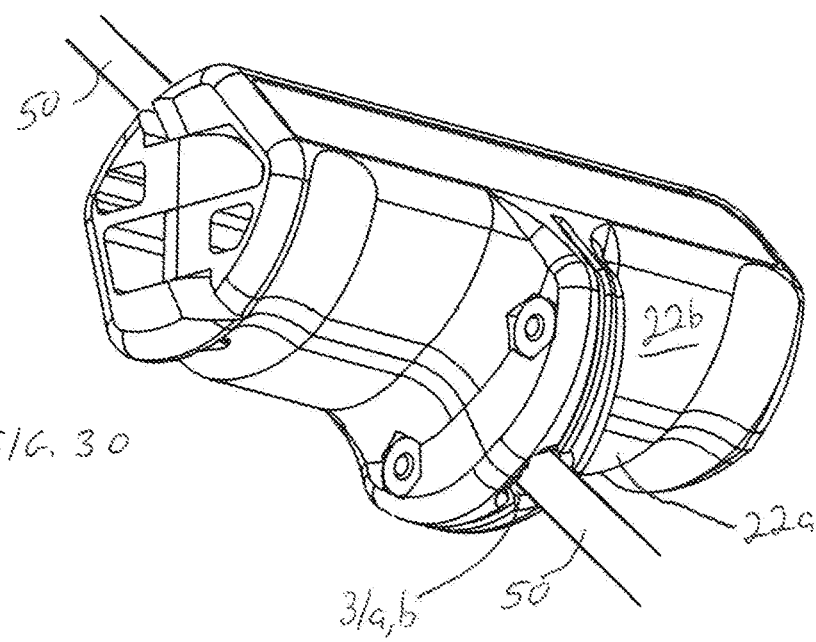
FIG. 30 is a left front top perspective view of the tube slitter of FIG. 14 in the open position.
Figure 31:
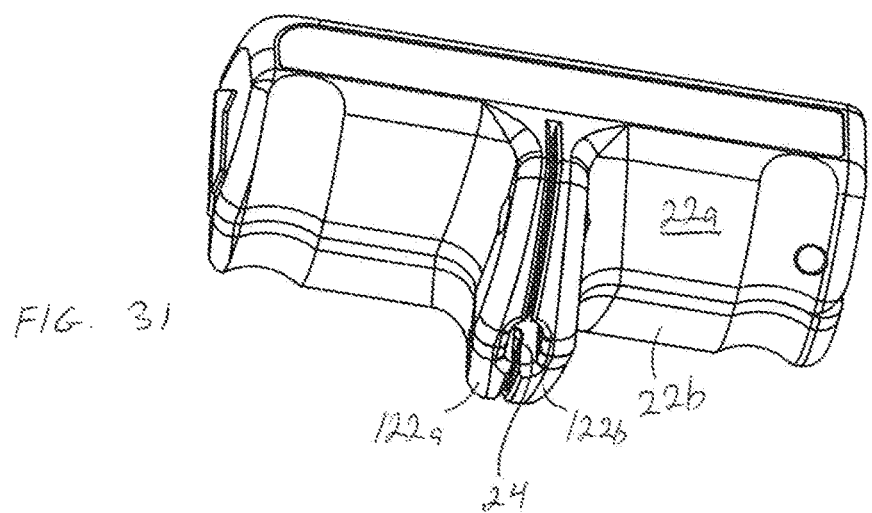
FIG. 31 is a front top perspective view of the tube slitter of FIG. 14 in the open position.
Figure 32:
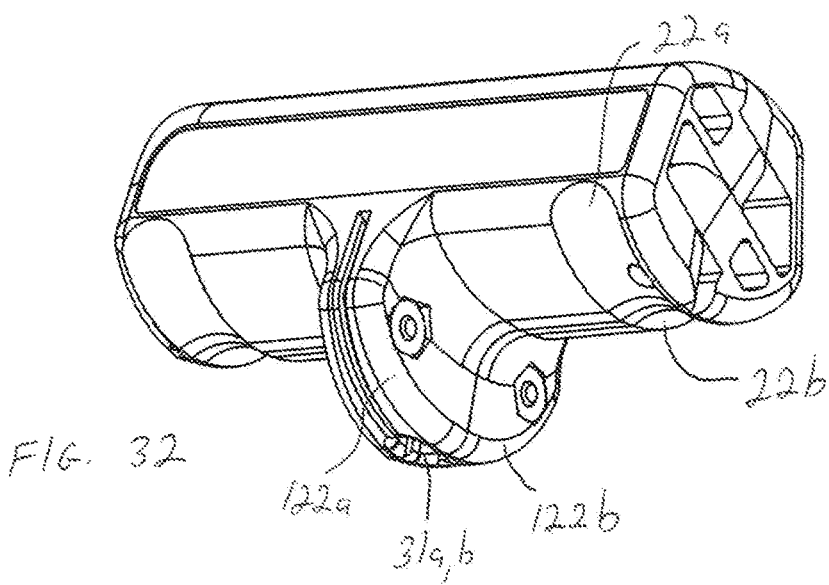
FIG. 32 is a right front top perspective view of the tube slitter of FIG. 14 in the open position.
Figure 33:
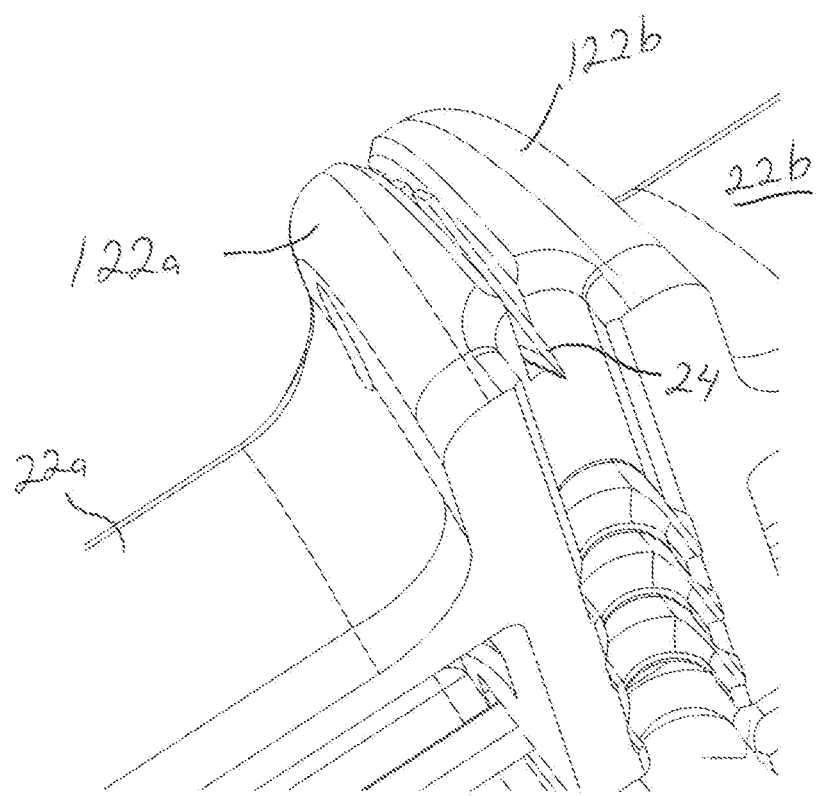
FIG. 33 is an enlarged perspective view of a portion of the tube slitter of FIG. 14 showing the blade secured and extending into the groove.
Figure 34:
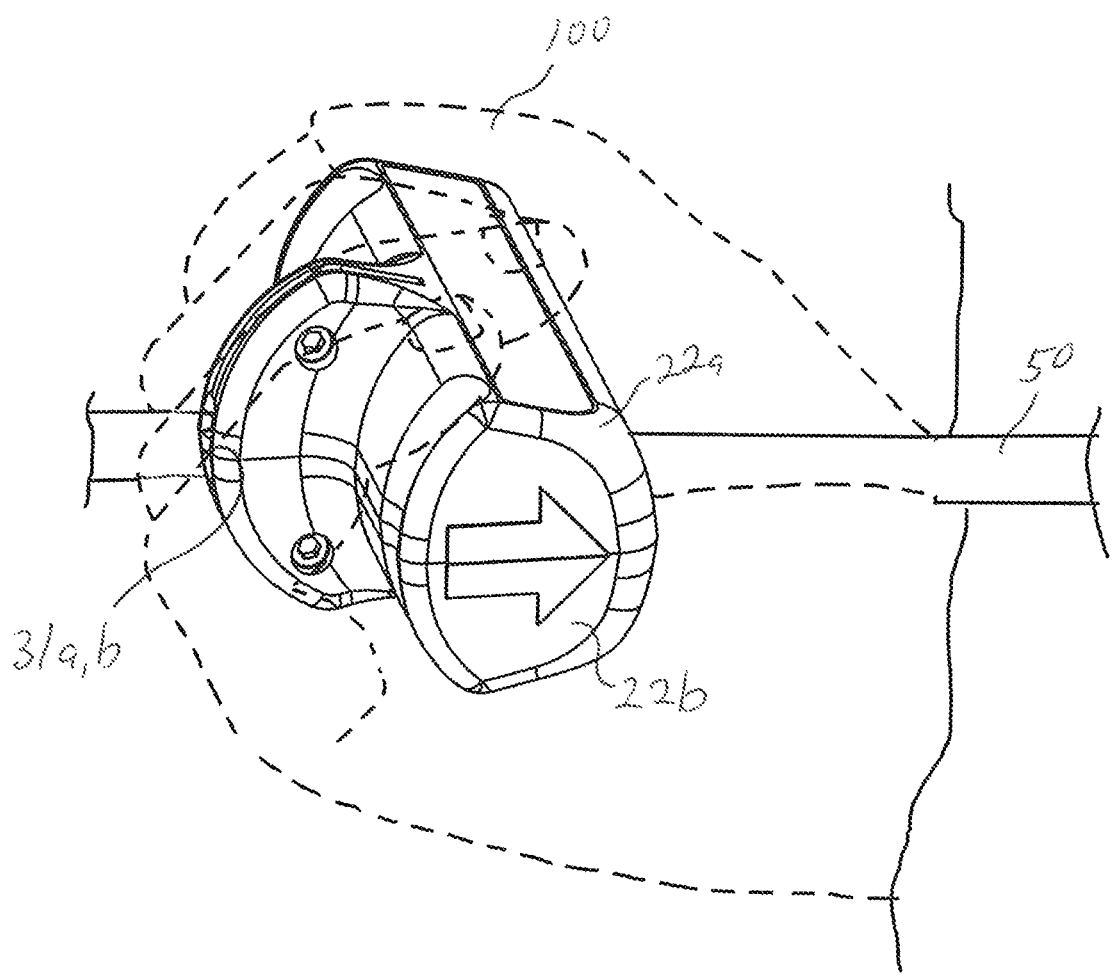
FIG. 34 is a perspective view of the tube slitter of FIG. 14 showing a method of using the tube slitter with an operator's hand grasping the tube slitter in the closed position with a cable or tube inserted through the opening formed by the concave surface.

Body portions 22*a*, 22*b* may contain on their interior slots or storage openings for spare blades and a hex wrench installation tool that are accessible when the tool is in the opened position (FIGS. 15, 17 and 20).

The tube slitter tool 20' includes the first and second body portions or opposite tool portions or 22*a*, 22*b*, each tool portion including a common hinged portion at a first tool end for engaging the opposite tool portion. The first and second opposite tool portions 22*a*, 22*b* are foldable about the hinged portion 40 between an open position and a closed, folded-together position, each of the first and second opposite tool portions 22*a*, 22*b* having a length L, width W, and height H, with the length extending in the direction from the hinged portion at the one end to a second end opposite the hinge. The width W extends in the direction perpendicular to the length L and the height H extends in the direction perpendicular to the length L and width W, the first and second opposite tool portions 22*a*, 22*b* meeting along a plane 250 (highlighted line 252 shows the plane lines on the tool 20') comprising the length L and width W when the tool 20' in the closed position. The tube or cable jacket slitting or cutting tool 20' includes at least one concave surface 31*a*, 31*b* extending across the width W of at least one of the first and second tool portions 22*a*, 22*b*, the at least one concave surface 31*a*, 31*b* forming an opening 44, when the first and second opposite tool portions 31*a*, 31*b* are in the closed position, through which a tube or cable 50 may be slid with respect to the tool 20'.

The tube or cable jacket slitting or cutting tool 20' includes a blade 24 extending inward into the opening formed 44 by the at least one concave surface for slitting or cutting a depth of the tube or cable jacket as it is moved with respect to the tool 20'. The tube or cable jacket slitting or cutting tool 20' includes a hinge pivot axis 60 in the hinged portion extending in a direction substantially in the direction of the width W and at an acute angle to either the plane or to the longitudinal axis 70 of the tube or cable in the opening formed by the at least one concave surface 31*a*, 31*b*. When the first and second opposite tool portions 22*a*, 22*b* are folded to the closed position with the tube or cable 50 in the opening, the blade 24 cuts into the tube or cable outer jacket 52 and movement of the tube or cable 60 with respect to the tool 20' in one direction to slit or cut the tube or cable jacket 52 with the blade 24 causes the first and second opposite tool portions 22*a*, 22*b* to be urged toward each other. Each of the tool portions 22*a*, 22*b* may include an alignment portion disposed near the second end and the first tool portion alignment portion may be engagable with the second tool portion alignment portion for maintaining alignment of the tool when the tool is in the closed position. The tube or cable jacket slitting or cutting tool 20' may include a projection 122*a*, 122*b* extending from a side of first and second opposite tool portions in the direction of the tool width W wherein the at least one concave 31*a*, 31*b* surface extends through the projection 122*a*, 122*b*. The blade 24 may extend inward into the opening formed by the at least one concave surface 31*a*, 31*b* in the projection 122*a*, 122*b*. The projection 122*a*, 122*b* may extend between a user's fingers when the user grasps the tool with the fingers extend substantially around the closed tool portions. The blade may extend inward into the opening formed by the at least one concave surface in the projection. The at least one concave surface 31*a*, 31*b* and blade 24 may be removable as a unit from the at least one of the first and second tool portions. The tube or cable jacket slitting or cutting tool 20' may include at least one concave surface 31a, 31b formed into and extending across the width of each of the first and second tool portions 22a, 22b, the at least one concave surface 31a, 31b in each tool portion 22a, 22b being in alignment with the other concave surface 22a, 22b to form an opening 44, wherein when the first and second opposite tool portions are in the closed position, the tube or cable 50 may be slid through the opening 44 with respect to the tool 20'. Extra or spare blades 26 (FIG. 21) may be secured in an interior portion of the tube slitter 20' with a spare blade fastener 27 and may be released using a fastener tool 28 secured in an interior portion of the slitting tool 20'. Alignment of the tool 20' in the closed position may be accomplished with male alignment protrusions 46 engaging female alignment depressions 47 to provide stabilization of the tool 20' during the pulling action of the tool 20' with respect to the tube or cable 50, the pulling action producing a twisting force on the off-axis hinge 40. The instant tool supports those forces on the opposite, non-hinge, end of the tool using the male alignment protrusions 46 and female alignment depressions 47 that limit the twisting of the hinge.

A method of using the tube or cable slitting tool as described above and shown in FIG. 34 includes ensuring the first and second tool portions are in an open position and placing a tube or cable 50 having an outer jacket into the opening formed by the at least one concave surface of the first or second tool portion 22a, 22b. The method includes moving the first and second tool portions 22a, 22b to the closed position whereby the blade 24 extending inward into opening 31a, 31b cuts the tube or cable 50 outer jacket and drawing a portion of the tube or cable 50 with respect to the tool 10 in a parallel direction to the at least one concave surface of the first or second tool half 22a, 22b whereby the blade 24 produces an elongated slit in the tube or cable 50 jacket. The method includes moving the tool 10 to the open position and removing the slit tube or cable 50 from the at least one concave surface of the first or second tool portion 22a, 22b. Drawing the tube 50 through the opening 31a, 31b formed by the at least one concave surface in one direction causes the first and second opposite tool portions 22a, 22b to be urged toward one another. One or both of the tool portions includes a projection 122a, 122b extending from a side thereof in the direction of the tool width, with the opening 31a, 31b formed by the at least one concave surface extending through the projection 122a, 122b, and wherein during drawing the tube. 50 through the at least one concave surface in one direction the projection extends between the tool operator's fingers when the user grasps the tool 10 with the fingers extend substantially around the closed tool portions 22a, 22b.

In other words, after moving the first and second tool body portions 22a, 22b about the hinge 40 into the open position, without disassembling the tool 10, the tool operator places tube or cable 50 having an outer jacket in one concave surface, and then moves the first and second tool portions about the hinge to the closed position. An end or mid-span portion of the tube or cable may be placed in the tool. In the case of the second tool embodiment, the operator grasps the tool such that the fingers extend substantially around the closed body portions 22a, 22b, with the projection 122a, 122b extending between the fingers. The blade cuts into the tube or cable outer jacket, and the operator draws the portion of the tube or cable extending from projection 122a, 122b outward in a parallel direction to the one concave surface (e.g., opposite the direction of the arrow on the tool housing shown in FIG. 18), so that the blade makes an elongated slit in the tube or cable jacket. The tool is drawn in the direction of the arrow with respect to the cable. After moving the tool to the open position, the slit tube or cable may be removed from the tool body portion.

The articulating hinge of the tool allows accurate end and mid-span stripping without disassembling the tool. The user simply closes the tool over the cable and pulls to slit the jacket. The blades are shielded to provide safe operation and prevent cuts and lacerations to the operator's fingers. The tool body may be made with lightweight materials, such as a polymer, and has an ergonomic design with convenient opening tabs which fits comfortably in the operator's hand and requires minimal effort to use. The blades may be reversible blades, and additional replacement blades may be stowed conveniently inside the tool.

Figure 35:
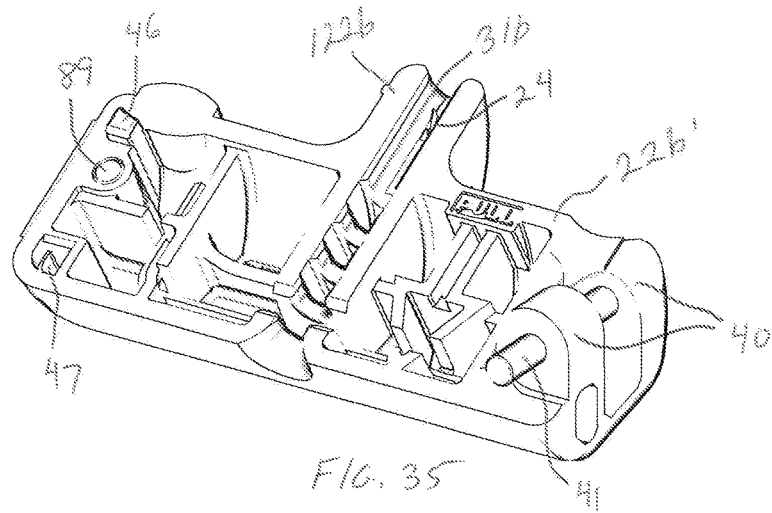
FIG. 35 is a perspective view of one tool portion half of the tube slitter according to a third embodiment of the present invention.
Figure 36:
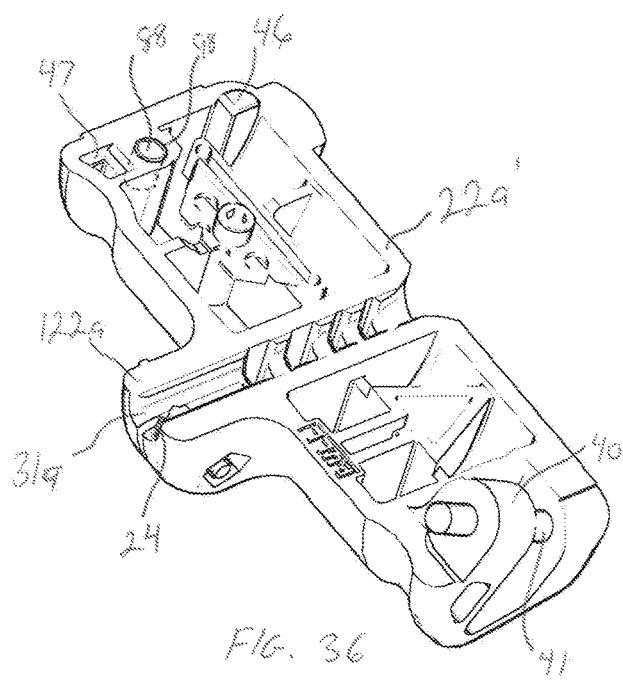
FIG. 36 is a perspective view of the opposite tool portion half of the tube slitter engagable with the third embodiment shown in FIG. 35.
Figure 37:
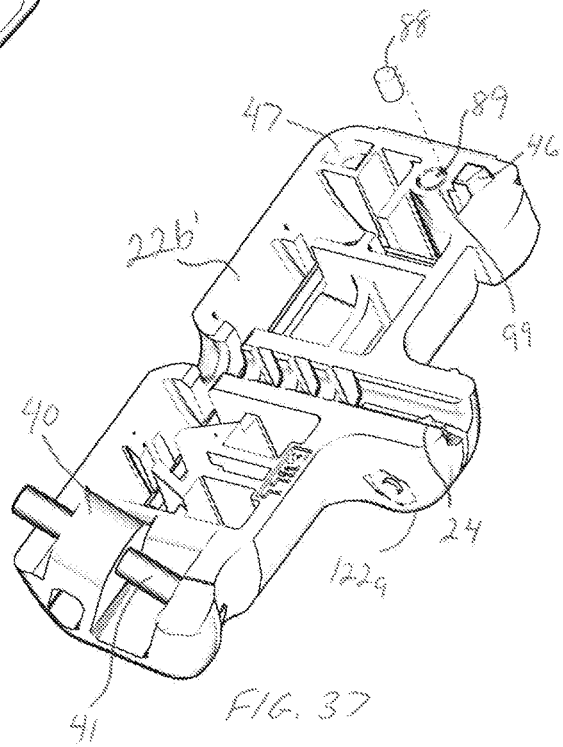
FIG. 37 is a perspective view of the one tool portion half of the tube slitter shown in FIG. 35.

FIGS. 35-37 are a perspective views of a third embodiment of the tube slitter and show the off-axis hinge 40 and the pin 41 allowing the first tool portion 22a' to rotatingly engage the second tool portion 22b'. The first or second tool portion 22a', 22b' includes a magnet 88 which is preferably a high strength earth magnet and the opposite tool portion includes an alloy dowel pin 89 which substantially contacts the magnet 88 when the tube slitter is in the closed position. FIG. 37 shows the second tool portion 22b' having the alloy dowel pin 89 secured in an opening 99 and the corresponding earth magnet 88 secured in first tool portion 22a' aligned with the dowel pin 89 (the first tool portion not shown) when the tube slitter is in a partially open position. FIGS. 35-37 additionally show the off-axis hinge 40 and hinge pin 41 common to both tool portions 22a', 22b'. The magnet 88 urges the allow dowel 89 toward the magnet 88 so that when the tool is in the closed position, the earth magnet 88 and allow dowel pin 89 secure the tool in a tightly closed position, maintaining the tight tolerances in slitting the cable or tube 50.

Thus, the present invention provides one or more of the following advantages: 1) The off-axis hinge transfers natural pulling pressure into blade engagement pressure. The tool is consistently held closed ensuring consistent cut depths. 2) The twist limiting features restricts over torqueing of hinge and supports off-axis loads generated by the hinge. 3) The tool is ergonomic convenient to the operator using one handed operation to hold the tool while pulling the tube or cable with the other hand.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tube or cable jacket slitting or cutting tool comprising:
    first and second opposite tool portions, each tool portion including a common hinged portion at a first end for engaging the first and second opposite tool portion, the first and second opposite tool portions being foldable about the hinged portion between an open position and a closed, folded-together position, each of the first and second opposite tool portions having a length, width, and height, with the length extending in the direction from the hinged portion at the one end to a second end opposite the hinge, the width extending in the direction perpendicular to the length, and the height extending in the direction perpendicular to the length and width, the first and second opposite tool portions meeting along a plane comprising the length and width when in the closed position;

at least one concave surface extending across the width of at least one of the first and second tool portions, the at least one concave surface forming an opening, when the first and second opposite tool portions are in the closed position, through which a tube or cable may be slid with respect to the tool;

a blade extending inward into the opening formed by the at least one concave surface for slitting or cutting a depth of the tube or cable jacket as it is moved with respect to the tool; and a hinge pivot axis in the hinged portion extending in a direction substantially in the direction of the width and at an acute angle to either the plane or to the longitudinal axis of the tube or cable in the opening formed by the at least one concave surface, wherein when the first and second opposite tool portions are folded to the closed position with the tube or cable in the opening, the blade cuts into the tube or cable outer jacket and movement of the tube or cable with respect to the tool in one direction to slit or cut the tube or cable jacket with the blade causes the first and second opposite tool portions to be urged toward each other.

2. The tool of claim 1 wherein each of the tool portions includes an alignment portion disposed near the second end and the first tool portion alignment portion is engagable with the second tool portion alignment portion for maintaining alignment of the tool when the tool is in the closed position.

3. The tool of claim 1 further including a projection extending from a side of first and second opposite tool portions in the direction of the tool width and wherein the at least one concave surface extends through the projection.

4. The tool of claim 3 wherein the blade extends inward into the opening formed by the at least one concave surface in the projection.

5. The tool of claim 3 wherein the projection extends between a user's fingers when the user grasps the tool with the fingers extend substantially around the closed tool portions.

6. The tool of claim 5 wherein the blade extends inward into the opening formed by the at least one concave surface in the projection.

7. The tool of claim 1 wherein the at least one concave surface and blade are removable as a unit from the at least one of the first and second tool portions.

8. The tool of claim 1 including at least one concave surface formed into and extending across the width of each of the first and second tool portions, the at least one concave surface in each tool portion being in alignment with the other concave surface to form an opening, wherein when the first and second opposite tool portions are in the closed position, the tube or cable may be slid through the opening with respect to the tool.

9. The tool of claim 1 including a magnet secured in the first or second tool portion and an alloy dowel pin secured in the other of the first or second tool portion wherein the magnet is disposed adjacent the alloy dowel when the tool is in the closed position, maintaining the tool in the closed position when a tube is drawn through the tool.

10. A tube or cable jacket slitting or cutting tool comprising:

first and second opposite tool portions, each tool portion including a common hinged portion at a first end for engaging the first and second opposite tool portion, the first and second opposite tool portions being foldable about the hinged portion between an open position and a closed, folded-together position, each of the first and second opposite tool portions having a length, width, and height, with the length extending in the direction from the hinged portion at the one end to a second end opposite the hinge, the width extending in the direction perpendicular to the length, and the height extending in the direction perpendicular to the length and width, the first and second opposite tool portions meeting along a plane comprising the length and width when in the closed position;

a projection extending from a side of the first and second opposite tool portions in the direction of the tool width;

at least one concave surface extending across the width of at least one of the first and second tool portions and through the projection, the at least one concave surface forming an opening, when the first and second opposite tool portions are in the closed position, through which a tube or cable may be slid with respect to the tool;

a blade extending inward into the opening formed by the at least one concave surface in the projection for slitting or cutting a depth of the tube or cable jacket as it is moved with respect to the tool, wherein when the first and second opposite tool portions are folded to the closed position with the tube or cable in the opening, the blade cuts into the tube or cable outer jacket and movement of the tube or cable with respect to the tool in one direction causes the blade to cut the tube or cable jacket; and a hinge pivot axis in the hinged portion extending in a direction substantially in the direction of the width and at an acute angle to either the plane or to the longitudinal axis of the tube or cable in the opening formed by the at least one concave surface, and wherein when the first and second opposite tool portions are folded to the closed position with the tube or cable in the opening, the blade cuts into the tube or cable outer jacket and movement of the tube or cable with respect to the tool in one direction to slit or cut the tube or cable jacket with the blade causes the first and second opposite tool portions to be urged toward each other.

11. A method of using the tube or cable slitting tool as described in claim 1 comprising:

ensuring the first and second tool portions are in an open position;

placing a tube or cable having an outer jacket into the opening formed by the at least one concave surface of the first or second tool portion;

moving the first and second tool portions to the closed position whereby the blade extending inward into at opening cuts the tube or cable outer jacket;

drawing a portion of the tube or cable with respect to the tool in a parallel direction to the at least one concave surface of the first or second tool half whereby the blade produces an elongated slit in the tube or cable jacket;

moving the tool to the open position; and removing the slit tube or cable from the at least one concave surface of the first or second tool portion.

12. The method of claim 11 wherein drawing the tube through the opening formed by the at least one concave surface in one direction causes the first and second opposite tool portions to be urged toward one another.

13. The method of claim 12 wherein one or both of the tool portions includes a projection extending from a side thereof in the direction of the tool width, with the opening formed by the at least one concave surface extending through the projection, and wherein during drawing the tube through the at least one concave surface in one direction the projection extends between the tool operator's fingers when the user grasps the tool with the fingers extend substantially around the closed tool portions.

14. The method of claim 13 wherein the blade extends inward into the opening formed by the at least one concave surface in the projection.

15. A method of using the tube or cable slitting tool as described in claim 10 comprising:
- ensuring the first and second tool portions are in an open position;
- placing a tube or cable having an outer jacket into the opening formed by the at least one concave surface of the first or second tool portion;
- moving the first and second tool portions to the closed position whereby the blade extending inward into at opening cuts the tube or cable outer jacket;
- grasping the tool with a user's fingers extend substantially around the closed tool portions wherein the projection extends between the tool operator's fingers;
- drawing a portion of the tube or cable with respect to the tool in a parallel direction to the at least one concave surface of the first or second tool half whereby the blade produces an elongated slit in the tube or cable jacket;
- moving the tool to the open position; and
- removing the slit tube or cable from the at least one concave surface of the first or second tool portion.

* * * * *